United States Patent [19]

Kippenberg et al.

[11] Patent Number: 4,889,760

[45] Date of Patent: Dec. 26, 1989

[54] FILLER LAYER ELECTRICAL COMPONENT AND METHOD FOR THE MANUFACTURE THEREOF

[75] Inventors: Horst Kippenberg, Herzogenaurach; Thomas Moser, Schnaittach; Klaus Otto, Nuremberg, all of Fed. Rep. of Germany

[73] Assignee: Siemens Aktiengesellschaft, Berlin and Munich, Fed. Rep. of Germany

[21] Appl. No.: 224,755

[22] Filed: Jul. 27, 1988

[30] Foreign Application Priority Data

Jul. 31, 1987 [DE] Fed. Rep. of Germany ....... 3725453

[51] Int. Cl.⁴ ............................................. B32R 9/00
[52] U.S. Cl. ................................. 428/192; 428/209; 428/210; 428/323; 428/325; 428/328; 428/426; 428/436; 428/433; 428/901; 156/89; 427/96
[58] Field of Search .............. 428/209, 210, 426, 432, 428/433, 292, 901, 323, 325, 328; 156/89; 427/96

[56] References Cited

U.S. PATENT DOCUMENTS

| 3,679,950 | 7/1972 | Rutt | 317/258 |
|---|---|---|---|
| 3,683,849 | 8/1972 | Atchley et al. | 118/50 |
| 3,965,552 | 6/1976 | Rutt | 427/96 |
| 4,030,004 | 6/1977 | Rutt | 428/192 |
| 4,071,880 | 1/1978 | Rutt | 428/192 |
| 4,189,760 | 2/1980 | Marshall | 361/321 |
| 4,353,957 | 10/1982 | Rutt et al. | 428/292 |
| 4,526,129 | 7/1985 | Braden | 118/503 |
| 4,561,954 | 12/1985 | Scrantom et al. | 204/192 R |
| 4,658,328 | 4/1987 | Sakabe | 361/309 |
| 4,675,644 | 6/1987 | Ott et al. | 338/21 |

FOREIGN PATENT DOCUMENTS

| 932558 | 7/1963 | United Kingdom . |
| 2106714 | 4/1983 | United Kingdom . |
| 2162371 | 1/1986 | United Kingdom . |

*Primary Examiner*—Thurman K. Page
*Assistant Examiner*—P. J. Ryan
*Attorney, Agent, or Firm*—Hill, Van Santen, Steadman & Simpson

[57] ABSTRACT

A sintered monolithic ceramic body of a filler layer component has cavities which are open at end faces alternating from layer to layer and which has openings toward the lateral faces. The cavities contain ceramic particles distributed in the volume to provide support elements and the cavities are completely filled with a metal or metal alloy having a melting temperature considerably lower than the sintering temperature of the ceramic body. The metal or metal alloy exhibits the property of wetting the surfaces of the ceramic layers in the cavity in its molten condition. Contacts are applied at the end faces of the ceramic body and the openings in the lateral faces of the body are limited so that the contacts do not electrically contact the metal or metal alloy filling at the lateral faces.

28 Claims, 2 Drawing Sheets

FILLER LAYER ELECTRICAL COMPONENT AND METHOD FOR THE MANUFACTURE THEREOF

BACKGROUND OF THE INVENTION

1. Field of the Invention

The present invention is directed generally to a filler layer electrical component having a sintered, monolithic body provided with cavities forming layers, the cavities being filled with metal fillings. The invention is also directed to a method for manufacturing a filler layer electrical component wherein layers are formed into stacks having cavities and the cavities are filled with metal fillings.

2. Description of the Related Art

Electrical multi-layer capacitors having sintered, monolithic ceramic bodies of dielectric material are disclosed in numerous forms in the patent literature. Generally, U.S. Pat. Nos. 3,679,950, 4,071,880, and 4,658,328, the latter of which corresponds to German Published Application No. 36 12 084 are the closest to the present invention of the patent literature.

U.S. Pat. No. 3,697,950 discloses a ceramic multilayer capacitor having a ceramic monolithic body with cavities filled with a metal. The cavities are open in alternation from layer to layer only to the end faces lying opposite one another and are closed to the ajoining lateral faces. Also disclosed in U.S. Pat. No. 3,679,950 is a method for manufacturing an electrical multi-layer capacitor wherein layers are produced from a suspension of material and a suspension is applied on the layers to form limited regions having a defined arrangement so that when the layers are assembled cavitis are formed which are each open only at one side. Since the limited suspension regions which form the cavities in the finished stack of a plurality of layers prepared in this way are closed on practically all sides, it is necessary that the stack be separated into individual ceramic bodies along parting lines, or cutting lines, lying perpendicular relative to one another so that the constituents of the suspension which are volatilized and/or decomposed can be eliminated from the suspension regions so that the cavities are formed in the sintering process.

In addition to other possible materials, metals having low melting points or metal alloys having low melting points are recited for the manufacture of capacitor electrodes within the cavities of the ceramic body. Lead or an alloy of 50% bismuth (Bi), 25% led (Pb) 12.5% 10 (Sn) and 12.5% cadmium (Cd) are examples of a metal and an alloy for such use. The metals and alloys have melting temperatures that are considerably lower than the sintering temperatures of, for example, 1325° C. required for sintering the monolithic ceramic body. Moreover, the alloys when melted hardly moisten the surface of the ceramic bodies at all. The contacts for the capacitor, which are usually composed of silver, are applied to the opposite end faces of the multi-layer capacitor disclosed in U.S. Pat. No. 3,679,950 and are applied after the impression of the molten metal into the ceramic body and after cooling of the saturated ceramic body.

U.S. Pat. No. 4,071,880 discloses practically the same electrical multi-layer capacitor having a sintered monolithic ceramic body as in U.S. Pat. 3,679,950 and the same considerations apply Over and above this, the U.S. Pat. No. 4,071,880 discloses the possibility of applying contacts to the end faces of the monolithic ceramic body before the saturation, or filling, of the cavities of the ceramic body, wherein the contacts are porous. The multi-layer capacitor disclosed therein is composed of a plurality of ceramic layers lying alternately on top of one another and of inner electrodes, as well as outer, double layer electrodes, or contacts, which are connected to the inner electrodes in a predetermined way. For example, a lamella-like electrode structure is present.

During the manufacture of a monolithic multi-layer capacitor of the above reference, untreated or unsintered ceramic laminae, or suspension layers, are first manufactured with the assistance of a stripping of doctor process using a stripper blade. The ceramic laminae so manufactured have a thickness of from 0.05 through 0.1 mm. A coal or carbon paste is then applied or printed onto the surface of the ceramic laminae, the paste being composed of coal or of a ceramic powder and carbon powder. The paste or suspension is applied in limited regions so that the finished ceramic body includes cavities which are open only toward the end faces lying opposite one another in alternation. A plurality of such printed ceramic laminae are arranged lying on top of one another in alternation and are joined to one another by applying a pressure force to form an integrated structure. Individual members are produced from the integrated structure by parting along cut lines which extend perpendicularly relative to one another. The individual members are then fired at a temperature of above 1000° C. to sinter the ceramic laminae and to eliminate the coal or carbon powder within the carbon paste which has been printed thereon. As a result, porous intermediate layers having ceramic powder in regions are produced in which the inner electrodes are to be formed. Following thereupon, the porous outer electrodes are applied to the sintered individual members as contacts. This can be performed, for example, on the basis of methods disclosed in U.S. Pat. Nos. 3,683,849, 4,526,129 and 4,561,954 and in Great British Pat. No. 2,106,714, German Pat. No. 27 22 140 or German Published application No. 36 38 286.

For example, the contacts are obtained by stoving a paste which is principally composed of nickel and which is mixed with a glazing compound. The ceramic body formed in this way is then introduced into a pressure vessel and is then dipped into a molten lead in a decompressed condition which serves as a conductor material for the capacitor coating. The temperature of the molten lead into which the ceramic body is dipped is between about 330° through 360° C. Subsequently, the pressure is raised to about 10 bar (atm) so that the molten lead penetrates, or saturates, under pressure into the cavities in the ceramic body through the porous, outer electrodes. The ceramic body is then removed from the molten lead, is cooled and is again exposed to normal pressure so that inner electrodes of lead are formed. Following thereupon, additional layers which provide for good solderability are applied to the outer electrodes.

To manufacture a multi-layer capacitor as set forth above, the outer electrodes applied to the monolithic ceramic body must be porous and must be formed or manufactured so that entry of the molten lead is initially possible to form the inner electrodes but, on the other hand, so that the lead of the inner electrodes is prevented from flowing out of the cavities of the ceramic body again when the body is removed from the molten lead. The molten metal dare not easily moisten the ceramic body, as expressly recommended in column 10, lines 51–58 of U.S. Pat. No. 4,071,880. In other words, the porous outer electrodes form penetration barriers under certain conditions.

The porous, outer electrodes are mainly composed of nickel which does not react with lead. The adhesion by the outer electrodes o the end faces of the ceramic body depends upon the quantity of glazing compound within the paste of which they are formed, the adhesive strength being improved with an increased amount of the glazing compound in the paste. When greater amounts of glazing compound is added to the paste, however, the number of pores formed in the outer electrodes is diminished so that penetration of lead through the electrodes is more difficult, whereas glass components block the intermediate layers and deteriorate the delivery of lead. The electrostatic capacitance can, therefore, not be set as desired even when the ceramic module is exposed to relatively high temperatures within the melt.

To resolve the described problems, U.S. Pat. No. 4,658,328, which corresponds to German Published Application 36 12 084, proposes that the cavities within the ceramic body be designed so that they are open at both end faces lying opposite one another as well as having a slight opening to the ajoining lateral faces so that the molten metal in the injection process can penetrate not only through the porous contacts, or outer electrodes, but also through the portions of the cavity which are slightly open at the lateral surfaces and are free of the contacts. The molten metal can nonetheless not flow out again from the cavities through the slight openings.

This U.S. patent and corresponding German published application also disclose a method encompassing a manufacturing process wherein contacts which remain porous are applied to the end faces.

German patent applications Nos. 36 27 936 and 36 27 929, which have been filed but have not been published as of the priority date of the present application, disclose multi-layer capacitors having a sintered, monolithic ceramic body and methods for the manufacture thereof. The applications propose that the metal used therein for the capacitor coatings have a low melting point to moisten the surfaces inside the cavities of the ceramic body, in contrast to metals or metal alloys hither to known for these purposes. A series of proposals are made therein for these metals or alloys.

According to these applications, the impression of these metals into the ceramic bodies continues to occur through the openings of the cavities which are directed to only one side, the cavities being either free of a contact at the time of metal impression or being capable of being covered with a porous contact. In the former instance, the contacts are subsequently applied.

The use of a moistening metal has the advantage that the metal no longer flows out of the cavities of the ceramic body when the latter is removed from the metal melt and that bonding of the metal fillings to the contacts is assured. Likewise, detaching of the parts after saturation is thereby facilitated.

The problems that have already been described occur when the metal alloy having a low melting point is impressed through porous contacts into cavities of the ceramic body that are open toward only one side. These problems cannot be eliminated by using metals or metal alloys that moisten well due to the risk of blocking the pores in the porous layer and thus the risk of inadequate filling of the cavities. Given the application of contacts after the impression of the molten metal into the ceramic and after cooling of the filled ceramic bodies, problems can again occur in that the bonding of the inner electrodes inside the ceramic body to the outer electrodes at the end faces can be inadequate.

Ceramic posistors (thermistors having a large positive resistance-temperature characteristic) in a layer format are disclosed, for example, in Great British Patent No. 932,558 and ceramic multi-layer varistors are disclosed, for example, in U.S. Pat. No. 4,675,644 which corresponds to European Published application No. 0 189 087.

SUMMARY OF THE INVENTION

An object of the present invention is to provide a filler layer electrical component and method for its manufacture which guarantees complete filling of the cavities in the ceramic body and good electrical contact bonding between the metal filling inside the ceramic body and the contacts, as well as assuring adequate stability of the component during the manufacturing process, particularly for pressure or centrifugal saturation or filling.

To achieve this object, the filler layer component which is, for example and electrical multi-layer capacitor, a posistor or a varistor has the features of: a) sintered monolithic ceramic body of ceramic material having dielectric or semiconductive properties that is; b) provided with cavities that, in alternation from layer to layer, are open toward end faces lying opposite one another and are at least in part open to the adjoining lateral faces, and contain ceramic particles distributed in the cavity volume that serve as support elements in the cavities between respective upper and lower ceramic layers; c) the cavities being completely filled with a metal filling that is composed of a metal or a metal alloy whose melting temperatures are considerably lower than the temperature required for sintering of the ceramic body; d) contacts present at the end faces and potentially extending around onto the lateral faces, the contacts respectively connecting the metal fillings to one another in electrically conductive fashion and being solderable themselves or being solderable on the basis of a further metal coating.

The filler layer component is inventively characterized by the further features of: e) the cavities having openings at the lateral faces that are limited so that the contacts have no contact to the metal fillings at the lateral faces; and f) the metal fillings being composed of a metal or a metal alloy having the property of wetting the surfaces of the ceramic layers in the cavities in the molten condition of the metal or metal alloy.

In the invention, the openings in the lateral faces to the cavities in successive layers are respectively arranged in alternation relative to the lateral faces, preferrably from layer to layer. A plurality of the openings can lie next to one another and be separated from one another by solid ceramic barriers. The sum of the length of such openings preferrably amount to between 10 and 80% of the overall length of the lateral faces.

Different alloys are preferrably used for the metal filling; thus, for example, a lead-indium alloy having an indium constituent of equal to or greater than 0.5 percent by weight and in particular 2.5 through 20 percent by weight; a lead-silver-indium alloy having at least 0.5 indium by weight and a total of up to 20% silver and indium by weight; or a lead-tin-indium alloy of a corresponding concentration; and also a copper-indium or silver-indium alloy may be used.

The contacts are preferably composed of nickel or alloys having a high nickel constituent, or of silver or alloys having a high silver constituent. The contacts may be formed by a double layer having an inner layer bonded to the metal filling in the cavities and an outer layer which is resistant to de-alloying. The contacts can either be transmissive for the saturation, or filling, metal or can be impermeable thereto.

If necessary, it is advantageous that at least those regions of the lateral faces which are free of contacts be covered with electrically insulating and moisten-tight material, such as, for example, plastic as already disclosed in U.S. Pat. No. 4,658,328 and in German published application No. 36 12 084.

The invention is also directed to improving a method for manufacturing a filler layer component for use as an electrical component, the method generally including the steps of: a) producing and drying from a suspension that contains a dielectric or semiconductive material in fine distribution layers having a thickness of 0.03 through 0.1 mm and having a width and length each amounting to a multiple of a length and width of ceramic bodies to be produced; b) applying and drying a suspension, for example, by printing onto the layers in the form of limited regions having a defined arrangement and having a thickness of from 0.005 through 0.02 mm and drying the suspension, this suspension containing constituents such as oxides, carbonates, carbon or lamp black, that volatilize during a subsequent sintering step, and also containing ceramic particles that remain essentially unaltered during the later sintering step; c) forming a stack of plurality of such layers, the suspension regions overlapping in the stack in large sub-areas and the stack being potentially provided with suspension layers free of suspension regions serving as cover layers for the top and/or bottom of the stack; d) compressing or consolidating the stack during a pressing process and subsequently dividing the stack along cut lines in a longitudinal direction and in a transverse direction; e) sintering the compressed stack or the individual members which have arisen therefrom at temperatures of 1000° C. or above with an appropriate heating and cooling curve; f) providing the sintered ceramic bodies with contacts at their end faces; and g) impressing molten metal into the cavities either by dipping the ceramic bodies provided with contacts into a molten metal in an autoclave potentially after prior evacuation so that the molten metal is subsequently pressed into the cavities of the ceramic body on the basis of over pressure and subsequently cooling the ceramic bodies above the metal melting point and reducing the over pressure to a normal pressure, or by charging the ceramic bodies provided with contacts with a molten metal in a centrifuge where the metal is pressed into the cavities of the ceramic bodies under the influence of centrifugal forces. In the method of the present invention is inventively characterized by the steps of: applying the contacts in method step f) of, for example, nickel or silver by printing such as silk screening by chemical or electrodeposition, with immersion methods, with metal spraying methods, or on the basis of surface-coating methods from a vapor phase such as by sputtering; and, in method step g), impressing the molten metal into the cavities predominately through the openings in a ceramic body which are open at the lateral faces, the molten metal being of a material that moistens the surface of the ceramic layers in the cavities.

The following advantages are achieved by the present invention: It has suprisingly been found that the use of metals or metal alloys that wet the surfaces in the cavities in the ceramic layers of the ceramic body leads to regions between the limited openings at the lateral faces which are free of metal in the normal case, due to the contraction of the metal. If contrary to expectations metallic bridges between some of the individual, limited openings should happen, there result no risk of arc-over between the antipolar electrodes, because the antipolar openings are placed at the opposite lateral faces of the ceramic body. Contraction of the inner electrode metal cannot occur at the locations in which this metal meets the metal of the contacts or outer electrodes applied before impressing or saturation, since a metallurgical reaction has already occured here. As needed for increasing the electrical insulation, the free surfaces of the lateral faces, or even the surfaces of the entire multi-layer capacitor, are preferably provided with an envelope of a known insulating material. The impression metal which may possibly be present at undesired locations can be removed in a simple way either chemically or mechanically.

Compared to the known devices, the filling paths for the present invention are shorter because the metal to be impressed also penetrates into the ceramic body from the lateral faces. Also, the filling of the cavities with metal occurs in a shorter time in the present invention. Since the lateral faces of the ceramic body are only partly open, the stability thereof is significantly increased during the manufacturing process, particularly to resist pressure or centrifugal saturating. Shorter saturating times and lower pressures can be used when impressing the metal because the saturating paths are of roughly of equal length so that a lower stressing of the ceramic bodies occurs.

The invention is preferably directed to multi-layer capacitors; however, it can also be used in posistors or varistors. The description of "ceramic particles contained in the volume of the cavities" covers both individual particles which serve as supporting elements and also covers a porous skeleton whose pores are connected to one another over the entire volume so that the impressed molten metal can penetrate completely in any case.

The term "ceramic material having dielectric or semiconductor properties" covers, in particular, ferroelectric, dielectric material having a perovskite structure, as well as for example titanates of alkaline earths, particularly of barium and also mixed titanates wherein barium is substituted by other alkaline earths or magnesium and/or wherein the titanium is substituted, for example, by tin. The dielectric material having a perovskite structure can be doped with additives such as, for example, antimony, bismuth, lanthanum or rare earth metals or with copper, or iron so that higher values of the dielectric constant or improved PTC (positive temperature coefficient) properties result or so that other electrical properties such as, for example, the temperature dependency thereof or the loss factor are varied in accordance with the desired requirements. Furthermore, the above term also covers the well known materials for varistors, i.e. resistors whose value of resistance is dependent upon the applied voltage, also referred to as voltage dependent resistors (VDR) and containing zinc oxide as their principal constituent.

DESCRIPTION OF THE PREFERRED EMBODIMENTS

Figure 1:
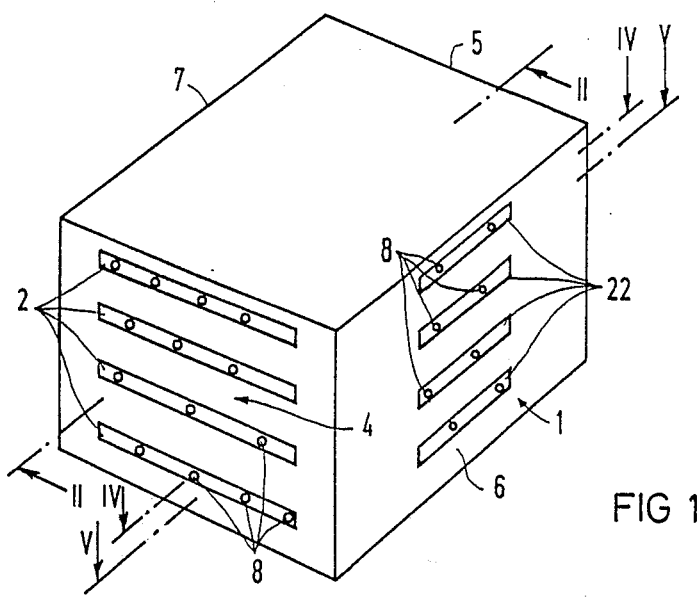
FIG. 1 is a perspective view of a monolithic, multi-layer ceramic body before the application of contacts and before filling of the cavities with a metal.

In FIG. 1 is shown a sintered, monolithic ceramic body 1 which is permeated by cavities 2 and 3. The cavities 2 are open toward the first end face 4 and the cavities 3 are open toward the opposite end face 5 of the ceramic body 1. Both cavities 2 and 3, however, are also open in alternation in their middle regions toward the opposing lateral faces 6 and 7 and, thus, include lateral saturation openings 22 and 23. Ceramic particles 8 are distributed throughout the volumes of the cavities 2 and 3 as described above and serve as supporting elements. The monolithic ceramic body 1 is formed by sintering together ceramic layers 9 and 10 which are of, for example, a dielectric.

The ceramic body of FIG. 1 is shown after the step of sintering but before the application of contacts to the end faces 4 and 5 and before the filling of the cavities 2 and 3 with a metal having a low melting point and, in particular, before the filling of the body 1 through the saturation openings 22 and 23. As a consequence of the solid regions in the areas of the edges of the cuboid ceramic body 1, the parts, or bodies, have a good stability during manipulation and simultaneously provide optimum accessibility to the cavities 2 and 3 through the openings 22 and 23 via pressure or centrifugal saturating.

Figure 2:
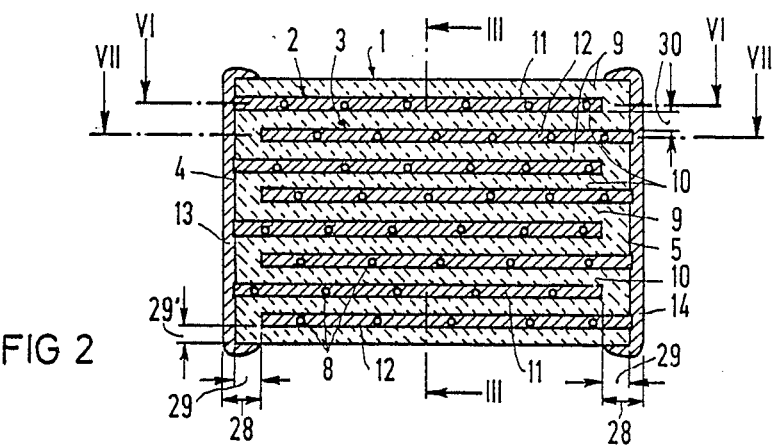
FIG. 2 is a cross section along line II—II in FIG. 1 showing a finished capacitor according to the principles of the present invention including inner electrodes and outer electrodes or contacts.

In FIG. 2, a finished multi-layer capacitor is shown in section. The monolithic ceramic body 1 is formed of sintered-together ceramic layers 9 and 10 whose cavities 2 and 3 are filled with metal fillings 11 and 12 to form inner electrodes. Alternating from layer to layer, the metal fillings 11 and 12 extend to the end faces 4 and 5 lying opposite one another and every other one of the metal fillings 11 and 12 are electrically connected to one another by contacts 13 and 14, respectively.

The contacts 13 and 14 can be formed on the ceramic body, for example, as shown in U.S. Pat. Nos. 3,679,950 and 4,071,880 wherein only the end faces 4 and 5 are covered. The contacts 13 and 14 are solderable in and of themselves or alternately may include a solderable further layer (not shown) to which power leads may be soldered. However, it is also possible and advantageous in many ways when the contacts 13 and 14 are formed not only at the end faces 4 and 5 but also extending around onto the lateral faces 6 and 7. An advantage of this arrangement is that the component can be, for example, used in surface mount device (SMD) technology as a chip component since it may be directly soldered to a printed circuit board provided with printed interconnects. In this case, the contacts 13 and 14 extend around onto the adjoining lateral faces 6 and 7 to such an extent that a seating surface of width 28 is provided. The width 28 is to be of such size that it is adapted to the surfaces to which the chip capacitor is to be soldered.

A distance 29 or 29' between the end of the contacts 13 and 14 and the ends of the metal fillings 12 or 11 which are connected to opposite electrical potentials is always at least as large as a distance 30 between two of the metal fillings or inner electrodes 11 and 12 so that the necessary insulation distances are guaranteed.

Figure 3:
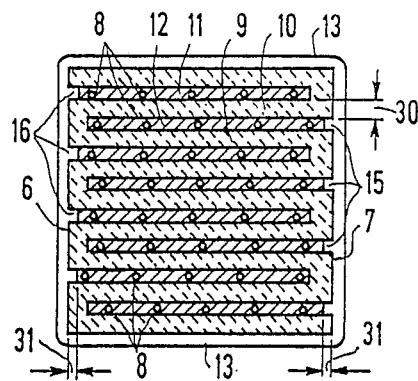
FIG. 3 is a cross section along line III—III of FIG. 2 showing alternate lateral face openings.

As can be seen in FIG. 3, spaces 16 and 15 are free of metal in the area of the lateral openings 22 and 23. The spaces 16 and 15 increase the extent of the electrical insulation between the metal fillings 11 and 12 since a depth 31 of the spaces 15 and 16 free of metal is present in addition added to the thickness 30 between the metal fillings 11 and 12.

FIGS. 4, 5, 6 and 7 show sections of FIGS. 1 and 2 to schematically explain the process of impressing a molten, moistening metal having low melting temperature into the cavities 2 and 3.

Figure 4:
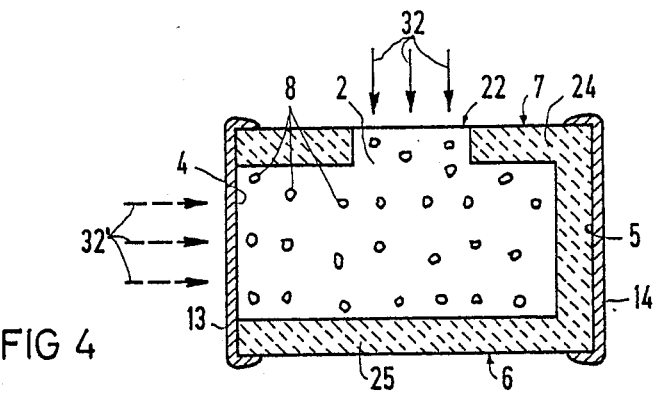
FIG. 4 is a cross section along line IV—IV of FIG. 1 showing a first cavity before filling with a metal but after application of contacts.
Figure 5:
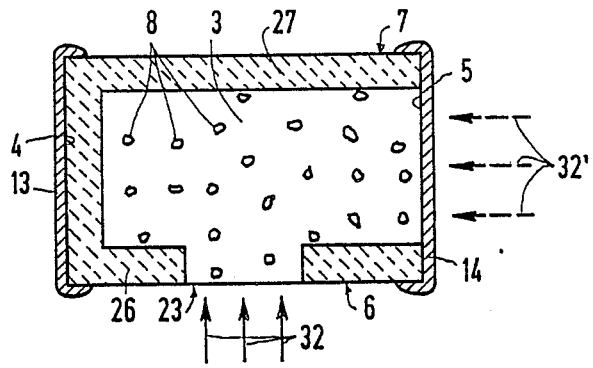
FIG. 5 is a cross section along line V—V in FIG. 1 showing a second cavity before filling with a metal but after application of contacts.

The individual parts which have already been described may be seen in FIGS. 4 and 5 in addition to which ceramic particles 8 are situated in the cavities 2 and 3 between the ceramic layers 9 and 10. In further detail, the cavities 2 and 3, in addition to being accessible through alternating access openings at the end faces 4 and 5 which are covered by the contacts 13 and 14, are also accessible through the lateral openings 22 and 23 that alternate laterally from layer to layer. Otherwise, the cavities 2 and 3 are limited by solid lateral edge regions 24 and 25 or 26 and 27, respectively, which vary in width. The solid lateral regions 24 and 25 and 26 and 27 have been formed in an earlier step by application of a suspension in limited regions to dried suspension layers. By so limiting, or defining, the lateral openings 22 and 23 into the cavities 2 and 3, each of the cavity systems in the ceramic body 1 can be saturated from sides lying opposite one another. As a result, the risk of an outside bridging of noncontiguous layers, i.e. a short, is avoided. Moreover, the solid edge regions 24 through 27 increase the cohesion and strength of the ceramic body so that there is no tendency to break during pressure or centrifugal saturating. In other words, by having the openings 22 and 23 open at only one side of each cavity 2 and 3 and by the limited size of the openings 22 and 23, a stronger ceramic body results.

The molten metal is pressed in through the openings 22 and 23 into the cavities 2 and 3 in accordance with a direction indicated by the arrows 32 in FIGS. 4 and 5. Depending upon whether the contacts 13 and 14 are formed porously or densely, a further saturation path may also be present as indicated by the broken arrows 32'. However, the saturation predominately ensues through the lateral openings in either case.

Figure 6:
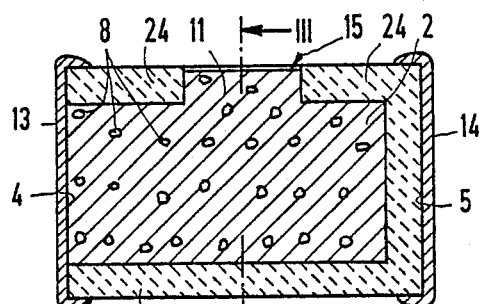
FIG. 6 is a cross section along line VI—VI of FIG. 2 showing the first cavity of FIG. 3 after filling the cavity with metal.
Figure 7:
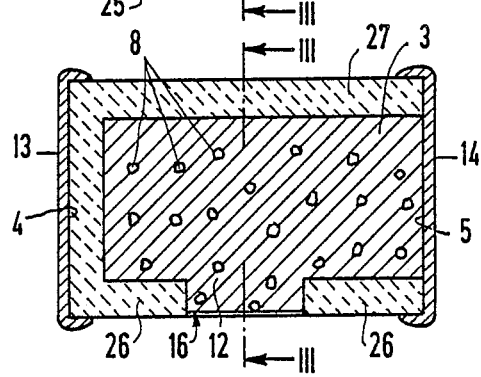
FIG. 7 is a cross section along line VII—VII of the multi-layer capacitor of FIG. 2 showing the second cavity of FIG. 4 after filling of the cavity with metal.

FIGS. 6 and 7 show the cavities 2 and 3 which have already been filled with solidified metal fillings 11 and 12. The ceramic particles 8 remain in the filled cavities. The metal fillings 11 and 12 extend up to and in electrical contact with the respective contacts 13 and 14 so that when differing voltages are applied to the end contacts 13 and 14, the alternating inner fillings or electrodes 11 and 12 are charged for capacitor operation. The spaces 15 and 16 are free of metal up to a depth 31 as the result of contraction of the solidifying metal filling during cooling. These spaces increase the distance between parts at different potential and lessen the chance of a faulty component being formed.

In further exemplary embodiments, the alternating saturation openings 22 and 23 for the cavities 2 and 3 are laterally offset relative to one another. A plurality of lateral openings to each cavity lying side by side can also be provided separated by solid ceramic barriers, whereby the overall length of the openings for each cavity amounts to between 10 through 80 percent of the side length. However, it must be guaranteed that the contacts do not touch the metal fillings at the side openings.

Although other modifications and changes may be suggested by those skilled in the art, it is the intention of the inventors to embody within the patent warranted hereon all changes and modifications as reasonably and properly come within the scope of their contribution to the art.

We claim as our invention:

1. A filler layer electrical component, comprising:
a sintered monolithic ceramic body of dielectric material;
said ceramic body being provided with cavities to form ceramic layers in said body, said cavities being open to end faces of said body alternately from layer to layer, said cavities having openings to adjacent lateral faces of said body, said openings in said lateral faces of said body alternate in successive cavities to respective ones of said lateral faces, said openings have a length for each of said cavities in a range of 10 through 80% of an overall length of said lateral faces;
ceramic particles being distributed in said cavities to form supporting elements between said ceramic layers;
metal fillings being provided in said cavities and being of a material having the property of wetting surfaces of said ceramic layers in said cavities when said material is in a molten condition, said metal fillings substantially completely filling said cavities, said material of said metal fillings having a melting temperature considerably lower than a temperature required for sintering said ceramic body; and
contacts at said end faces of said body and extending onto said lateral faces, said contacts being electrically conductively connected to said metal fillings, said contacts being solderable, electrical contact of said contacts to said metal filling at said lateral faces being prevented by said limited openings.

2. A filler layer electrical component as claimed in claim 1, wherein said openings in said lateral faces of said body lie side-by-side and are separated from one another by solid ceramic barriers, said openings being connected to said cavities.

3. A filler layer electrical component as claimed in claim 1, wherein said lead-indium alloy has an indium constituent of between approximately 2.5 through 20 percent by weight.

4. A filler layer electrical component as claimed in claim 1, wherein said metal fillings are essentially of lead-tin-indium alloys.

5. A filler layer electrical component as claimed in claim 1, wherein said metal fillings are essentially of copper-indium alloys.

6. A filler layer electrical component as claimed in claim 1, wherein said metal fillings are essentially of silver-indium alloys.

7. A filler layer electrical component as claims in claim 1, wherein said contacts are essentially of nickel.

8. A filler layer electrical component as claimed in claim 1, wherein said contacts are essentially of an alloy having a high nickel constituent.

9. A filler layer electrical component as claimed in claim 1, wherein said contacts are essentially of silver.

10. A filler layer electrical component as claimed in claim 1, wherein said contacts are essentially of an alloy having a high silver constituent.

11. A filler layer electrical component as claimed in claim 9, wherein said contacts have a silver base and further include a double layer, an inner layer of said double layer being bonded to said metal fillings in said cavities and an outer layer of said double layer being of a material that is resistant to de-alloying.

12. A filler layer electrical component as claimed in claim 1, wherein said contacts have been applied by printing.

13. A filler layer electrical component as claimed in claim 12, wherein said contacts have been applied by silk screening.

14. A filler layer electrical component as claimed in claim 1, wherein said contacts have been applied by dipping.

15. A filler layer electrical component as claimed in claim 1, wherein said contacts have been applied electrolytically.

16. A filler layer electrical component as claimed in claim 1, wherein said contacts have been applied chemically.

17. A filler layer electrical component as claimed in claim 1, wherein said contacts have been applied by a metal spraying method.

18. A filler layer electrical component as claimed in claim 1, wherein said contacts have been applied by a surface coating method from a vapor phase.

19. A filler layer electrical component as claimed in claim 18, wherein said contacts have been applied by sputtering.

20. A filler layer electrical component as claimed in claim 1, further comprising: electrically insulating and moisture-tight material covering at least those regions of said lateral faces of said body that are free of said contacts.

21. An improved filler layer component having a sintered monolithic ceramic body of dielectric material which is provided with cavities that alternating from layer to layer are open to end faces lying opposite one another, said cavities being at least partially open to adjacent lateral faces, ceramic particles contained within said ceramic body to serve as supporting elements in said cavities between ceramic layers, metal filling completely filling said cavities, said metal filling being of a metal or metal alloy having a melting temperature that is considerably lower than a temperature for sintering of said ceramic body, contacts provided at an end face and extending a round to said lateral faces, said contacts connecting said metal fillings to one another in an electrically conductive fashion, said contacts being solderable, the improvement comprising:

said cavities being opening at said lateral surfaces, said openings being limited to prevent electrical contact of said metal fillings with said contacts at said lateral faces;

said metal fillings being composed of a material that has a property of moistening surfaces of said ceramic layers in said cavities when in a molten condition.

22. A method for manufacturing a filler layer of electrical component, comprising the steps of:
 (a) producing layers from a first suspension containing a dielectric material in fine distribution by drying, said layers having a thickness of between approximately 0.03 through 0.1 mm, inclusive, said layers having a length and width amounting to a multiple of a width and length of a an individual ceramic body to be formed;
 (b) applying and drying a second suspension on said layers in limited regions having a defined arrangement and having a thickness of approximately 0.005 through 0.02 mm, inclusive, said second suspension including constituents that escape during sintering and said suspension containing ceramic particles that remain essentially unaltered during sintering;
 (c) forming a stack of a plurality of said layers, said limited regions of applied second suspension overlapping in said stack in large sub-areas;
 (d) compressing said stack by pressing;
 (e) dividing said stack along cut lines in longitudinal directions and in transverse directions to form said individual ceramic bodies;
 (f) sintering said individual ceramic bodies at temperatures of at least 1000 degrees Celsius, said sintering being carried out with an appropriate heating and cooling curve;
 (g) providing said sintered individual bodies with contacts at their end faces, said contacts being of a material selected from the group consisting of nickel and silver; and
 (h) forcing molten metal into said cavities of said individual bodies predominantly through openings in lateral faces of said individual bodies, said molten metal moistening surfaces of said ceramic layers.

23. A method as claimed in claim 22, wherein said application of said second suspension of step b) is by printing.

24. A method as claimed in claim 22, wherein said constituents of said second suspension are selected from the group consisting of oxides, carbonates, carbon and lamp black.

25. A method as claimed in claim 22, further comprising:
 providing ceramic layers that are free of suspension regions to serve as cover layers, said cover layers being provided during formation of said stack in step c).

26. A method as claimed in claim 22, wherein said step (h) of forcing molten metal into said cavities includes the steps of:
 (i) dipping said ceramic bodies into a molten metal in an autoclave,
 (ii) pressing said molten metal into said cavities using over-pressure,
 (iii) cooling said ceramic bodies below melting temperature of said metal, and
 (iv) reducing pressure to normal.

27. A method as claimed in claim 26, wherein step (i) is preceded by a step of:
 evacuating said cavities of said ceramic body.

28. A method as claimed in claim 22, wherein said step (h) of forcing molten metal into said cavities includes the step of:
 (i) charging the ceramic bodies having contacts with molten metal using a centrifuge, said molten metal being pressed into said cavities of said ceramic bodies under the influence of centrifugal force generated by said centrifuge.

* * * * *